(12) United States Patent
Müller (10) Patent No.: US 10,027,128 B2
(45) Date of Patent: Jul. 17, 2018

(54) CONTROL SYSTEM AND METHOD FOR GENERATOR SETS (71) Applicant: Caterpillar Motoren GmbH & Co. KG, Kiel (DE)

(72) Inventor: Bernd Müller, Schwedeneck / Stohl (DE)

(73) Assignee: Caterpillar Motoren GmbH & Co. KG, Kiel (DE)

( * ) Notice: Subject to any disclaimer, the term of this patent is extended or adjusted under 35 U.S.C. 154(b) by 420 days.

(21) Appl. No.: 14/789,474

(22) Filed: Jul. 1, 2015

(65) Prior Publication Data

US 2016/0006256 A1    Jan. 7, 2016

(30) Foreign Application Priority Data

Jul. 7, 2014    (EP) ..................................... 14175998

(51) Int. Cl.
*H02J 4/00*        (2006.01)
*G05B 19/042*   (2006.01)

(52) U.S. Cl.
CPC ............ *H02J 4/00* (2013.01); *G05B 19/0425* (2013.01)

(58) Field of Classification Search
CPC ........................................................ H02J 4/00

USPC .......................................................... 307/84
See application file for complete search history.

(56) References Cited

U.S. PATENT DOCUMENTS

| | | | |
|---|---|---|---|
| 7,656,060 B2 * | 2/2010 | Algrain ..................... | H02J 3/42 307/84 |
| 7,692,335 B2 * | 4/2010 | Michalko ............... | H02K 7/003 307/84 |
| 8,358,036 B2 * | 1/2013 | Dozier ...................... | H02J 3/38 307/81 |
| 8,738,268 B2 * | 5/2014 | Karimi ..................... | H02J 3/38 244/53 R |

FOREIGN PATENT DOCUMENTS

| | | |
|---|---|---|
| WO | 2007067064 | 6/2007 |
| WO | 2013164392 | 11/2013 |

* cited by examiner

*Primary Examiner* — Joseph Chang (57) ABSTRACT

A lip shroud for a dragline lip configured to prevent wear on the dragline lip and to prevent decoupling therefrom during operations. The lip shroud comprises of a first sidewall having a first abutment surface provided with an opening; a second sidewall having a second abutment surface wherein the second sidewall has a securing portion configured for coupling to a lock device on the dragline lip; and a center-wall having a third abutment surface, the center wall connecting the first sidewall and the second sidewall wherein the first, second and third abutment surfaces define a channel to receive an edge portion of the dragline lip.

17 Claims, 4 Drawing Sheets

CONTROL SYSTEM AND METHOD FOR GENERATOR SETS

CLAIM FOR PRIORITY

This application claims benefit of priority of European Patent Application No. 14175998.5, filed Jul. 7, 2014, which is incorporated herein by reference.

TECHNICAL FIELD

The present disclosure generally relates to a control system and method for operating a plurality of generator sets. More particularly, the present disclosure relates to a control system and method for operating a plurality of generator sets connectable to a plurality of load bus segments, wherein the load bus segments are selectively connectable and isolatable by at least one tie breaker.

BACKGROUND

For producing electric power, an internal combustion engine can be coupled to a generator to form a so-called generator set (often also referred to as genset). Thus, a mechanical output of the internal combustion engine is transformed into an electrical output of the generator, which can be supplied to a power network.

In so-called load share applications, more than one generator set may be provided, for example in a power plant, offshore application, or on a ship. Individual generator sets may be connected to one another to share a common load on a common load bus, or may be isolated from one another to individually produce electric power. As one skilled in the art will appreciate, the more generator sets are connectable to one another to build up a plurality of load groups, the more complex and complicate a control system for controlling operation of the generator sets may become as a plurality of information may have to be gathered, distributed and assessed by a plurality of control units coupled to each individual generator set.

The present disclosure is directed, at least in part, to improving or overcoming one or more aspects of prior systems.

SUMMARY OF THE DISCLOSURE

In an aspect of the present disclosure, a control system for operating a plurality of generator sets is disclosed. The control system may comprise a plurality of control units configured to control an operation of a respective one of the plurality of generator sets. The control system may further comprise a data bus connected to the plurality of control units for transmitting data. Further, the control system may comprise a plurality of load bus segments configured to be connected to a respective one of the plurality of generator sets. Still further, the control system may comprise at least one tie breaker. Each tie breaker may be arranged between two load bus segments of the plurality of load bus segments to selectively connect the two load bus segments in a closed position and isolate the two load bus segments in an opened position. Each tie breaker may be directly connected to at least one of the plurality of control units. The plurality of control units may be further configured to receive a signal from the directly connected tie breaker indicative of a position of the respective tie breaker, and provide the signal to at least one further control unit of the plurality of control units via the data bus.

In another aspect of the present disclosure, a method for operating a plurality of generator sets selectively connectable to one another via at least one tie breaker to form load groups is disclosed. The method may comprise receiving, by a first generator set of the plurality of generator sets, a first signal from a first tie breaker of the at least one tie breaker. The first signal may be indicative of a closed position or an opened position of the first tie breaker. The method may further comprise providing, by the first generator set, the first signal to at least one further generator set of the plurality of generator sets. The method may further comprise receiving, by the at least one further generator set, the first signal from the first generator set. The method may further comprise operating the plurality of generator sets based on the first signal.

Other features and aspects of this disclosure will be apparent from the following description and the accompanying drawings.

BRIEF DESCRIPTION OF THE DRAWINGS

The accompanying drawings, which are incorporated herein and constitute a part of the specification, illustrate exemplary embodiments of the disclosure and, together with the description, serve to explain the principles of the disclosure. In the drawings.

DETAILED DESCRIPTION

The following is a detailed description of exemplary embodiments of the present disclosure. The exemplary embodiments described therein and illustrated in the drawings are intended to teach the principles of the present disclosure, enabling those of ordinary skill in the art to implement and use the present disclosure in many different environments and for many different applications. Therefore, the exemplary embodiments are not intended to be, and should not be considered as, a limiting description of the scope of patent protection. Rather, the scope of patent protection shall be defined by the appended claims.

The present disclosure is based in part on the realization that load group allocation of generator sets is simplified by using a common data bus connected to each generator set control unit. Particularly, for example, by directly connecting each load bus tie breaker to one generator set control unit only, a wiring of the control system may include a small number of individual connections only. The control units are configured to provide the received information from the directly connected load bus tie breaker to the other control units via the data bus.

The present disclosure is further based in part on the realization that a compromise between a reliable control system and a less complicate control system may use a common data bus connected to generator set control units and connections from each load bus tie breaker to two control units of different generator sets. By providing said certain amount of redundancy, faults in the control system may be reliably detectable without substantially complicating the control system, for example, in terms of additional wiring.

Figure 1:
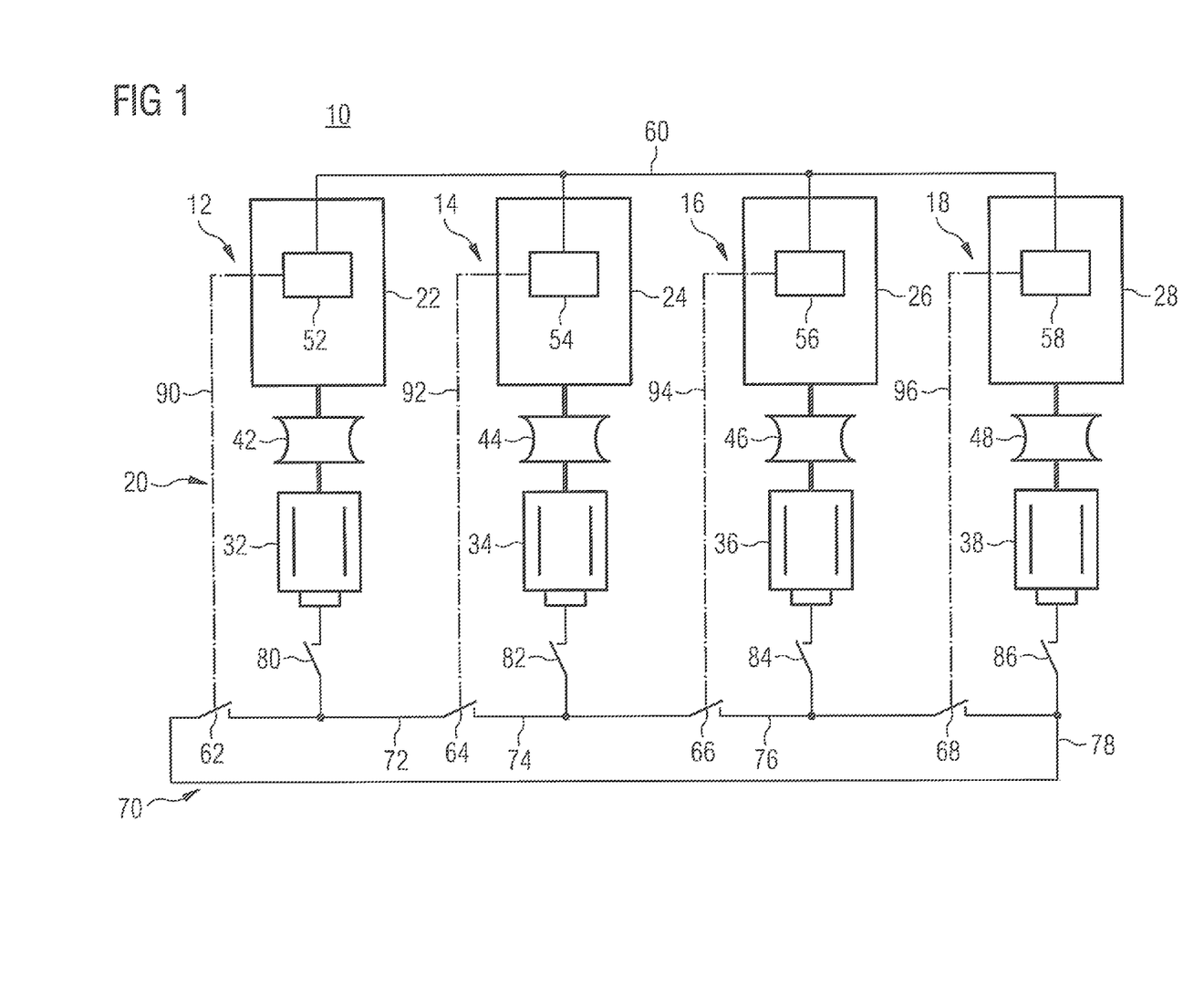
FIG. 1 shows a group of generator sets including an embodiment of the control system according to the present disclosure.

Referring to FIG. 1, a group 10 of a plurality of generator sets (gensets) is shown. Group 10 comprises a first, second, third and fourth generator set 12, 14, 16, and 18. Further, group 10 is controlled by a control system referred to in its entirety by reference numeral 20.

Each generator set 12, 14, 16, and 18 includes an internal combustion engine 22, 24, 26, and 28, and a generator 32, 34, 36, and 38, respectively. Internal combustion engines 22, 24, 26, and 28 are drivingly connected to respective generators 32, 34, 36, and 38, for example by flexible couplings 42, 44, 46, and 48 as shown in FIG. 1.

It is contemplated that group 10 may include any number of a plurality of generator sets, for example two, three or four generator sets (as shown in the exemplary embodiment of FIG. 1). Generator sets 12, 14, 16, and 18 may include features not shown, such as engine fuel systems, engine air systems, cooling systems, peripheries, drivetrain components, etc. Furthermore, generator sets 12, 14, 16, and 18 may be of any size, and in any configuration. For example, internal combustion engines 22, 24, 26, and 28 may include any number of cylinders, in any configuration ("V," in-line, radial, etc.), and may be powered with any type of fuel including, but not limited to, diesel, gasoline, and/or gaseous fuel. Still further, generator sets 12, 14, 16, and 18 may be used in mobile or stationary power plants, or to power any machine or other device including, but not limited to, locomotive applications, on-highway trucks or vehicles, off-highway trucks or machines, earth moving equipment, aerospace applications, marine applications, pumps, stationary equipment, or other generator set powered applications.

Control system 20 includes control units 52, 54, 56, and 58, and a data bus 60, for example a CAN bus. Data bus 60 communicatively connects control units 52, 54, 56, and 58 to one another for transmitting any kind of data. Further, control system 20 comprises a load bus 70.

Specifically, control units 52, 54, 56, and 58 are configured as engine control units for operating respective internal combustion engines 22, 24, 26, and 28. For example, control units 52, 54, 56, and 58 may adapt a load, speed, air intake amount, air intake pressure, fueling amount, ignition timing etc. of the respective internal combustion engine. Control units 52, 54, 56, and 58 may be single microprocessors or multiple microprocessors that include means for controlling, among others, an operation of various components of the respective internal combustion engine. Further, control units 52, 54, 56, and 58 may be general engine control unit (ECU) capable of controlling numerous functions associated with the respective internal combustion engine and/or its associated components. Still further, control units 52, 54, 56, and 58 may include all components required to run an application such as, for example, a memory, a secondary storage device, and a processor such as a central processing unit or any other means known in the art for controlling the respective internal combustion engine and its components. Various other known circuits may be associated with control units 52, 54, 56, and 58, including, but not limited to, power supply circuitry, signal conditioning circuitry, communication circuitry and other appropriate circuitry. Still further, control units 52, 54, 56, and 58 may analyze and compare received and stored data and, based on instructions and data stored in memory or input by a user, determine whether action is required.

Load bus 70 comprises four load bus segments (sections) 72, 74, 76, and 78, which are arranged in series and in a closed loop. Individual load bus segments 72, 74, 76, and 78 may be used for providing power for different applications. For instance, in the case of a mobile machine such as a ship (not shown), one or more load bus segments may be used to provide power to a propulsion device such as a propeller, whereas another load bus segment may be used to provide power to auxiliary devices such as heating devices. A further load bus segment may be used for a general on-board power supply.

Furthermore, individual load bus segments 72, 74, 76, and 78 are connectable to one another for sharing loads as is described in the following. Specifically, between a first load bus segment 72 and a fourth load bus segment 78 (which is the last load bus segment in the embodiment shown in FIG. 1), a first tie breaker 62 is disposed. First tie breaker 62 selectively connects first and fourth load bus segments 72 and 78 in a closed position or isolates first and fourth load bus segments 72 and 78 in an opened position. Similarly, second, third and fourth tie breakers 64, 66, and 68 are positioned between first and a second load bus segment 72 and 74, second and a third load bus segment 74 and 76, and third and fourth load bus segment 76 and 78, respectively. Like first load bus tie breaker 62, remaining load bus tie breakers 64, 66, and 68 also serve to electrically couple or isolate respective load bus segments.

Each load bus tie breaker 62, 64, 66, and 68 is directly communicatively connected with one of control units 52, 54, 56, and 58 via respective communication lines 90, 92, 94, and 96 (indicated in FIG. 1 as dashed-dotted lines). Said connections particularly serve to transmit position (state) data (for example, closed position or opened position) of each tie breaker 62, 64, 66, and 68 to control units 52, 54, 56, and 58. In the shown embodiment, for practical reasons, each load bus tie breaker 62, 64, 66, and 68 is in communication with one of the two control units 52, 54, 56, and 58 of generator sets 12, 14, 16, 18, which could be coupled together via the respective tie breaker 62, 64, 66, and 68 in the closed position.

For example, first tie breaker 62 is connected to first control unit 52 via first communication line 90. However, based on, for example, the specific application and practical requirements, other embodiments may include different wiring. Further examples will be discussed herein when referring to FIGS. 2 to 4.

Generally, each load bus tie breaker is connected (disposed) between an upstream load bus segment and a downstream load bus segment. For example, third load bus tie breaker 66 is arranged between second load bus segment 74 and third load bus segment 76, wherein second load bus segment 74 constitutes the upstream load bus segment and third load bus segment 76 constitutes the downstream load bus segment.

In some embodiments, for example as shown in FIG. 1, each tie breaker is directly connected to that control unit, which is associated with the load bus segment (via the respective generator set connectable to the respective load bus segment) at which the respective tie breaker is connected. In the embodiment shown in FIG. 1, each tie breaker is directly connected to that control unit associated with the load bus segment downstream of the respective load bus tie breaker. Additionally or alternatively, each tie breaker may be directly connected to that control unit associated with the respective load bus segment upstream of the tie breaker.

Referring again to control units 52, 54, 56, and 58, the same are configured to receive position data in the form of signals from directly connected load bus tie breakers 62, 64, 66, and 68, and to provide said signals in an identical or processed form to respective remaining control units 52, 54, 56, and 58 via common data bus 60. Moreover, based on information received from respective directly connected load bus tie breakers 62, 64, 66, and 68 and data bus 60, control units 52, 54, 56, and 58 are further configured to allocate load group numbers for respective generator sets 12, 14, 16, and 18, which will be described in detail later on.

To electrically connect or isolate generator sets 12, 14, 16, and 18 and their respective load bus segment 72, 74, 76, and 78, generator set tie breakers 80, 82, 84, and 86 are disposed between outputs of generator sets 12, 14, 16, and 18 and inputs of load bus segment 72, 74, 76, and 78. Although not depicted, said generator set tie breakers 80, 82, 84, and 86 may be communicatively connected to respective control units 52, 52, 56, and 58.

Figure 2:
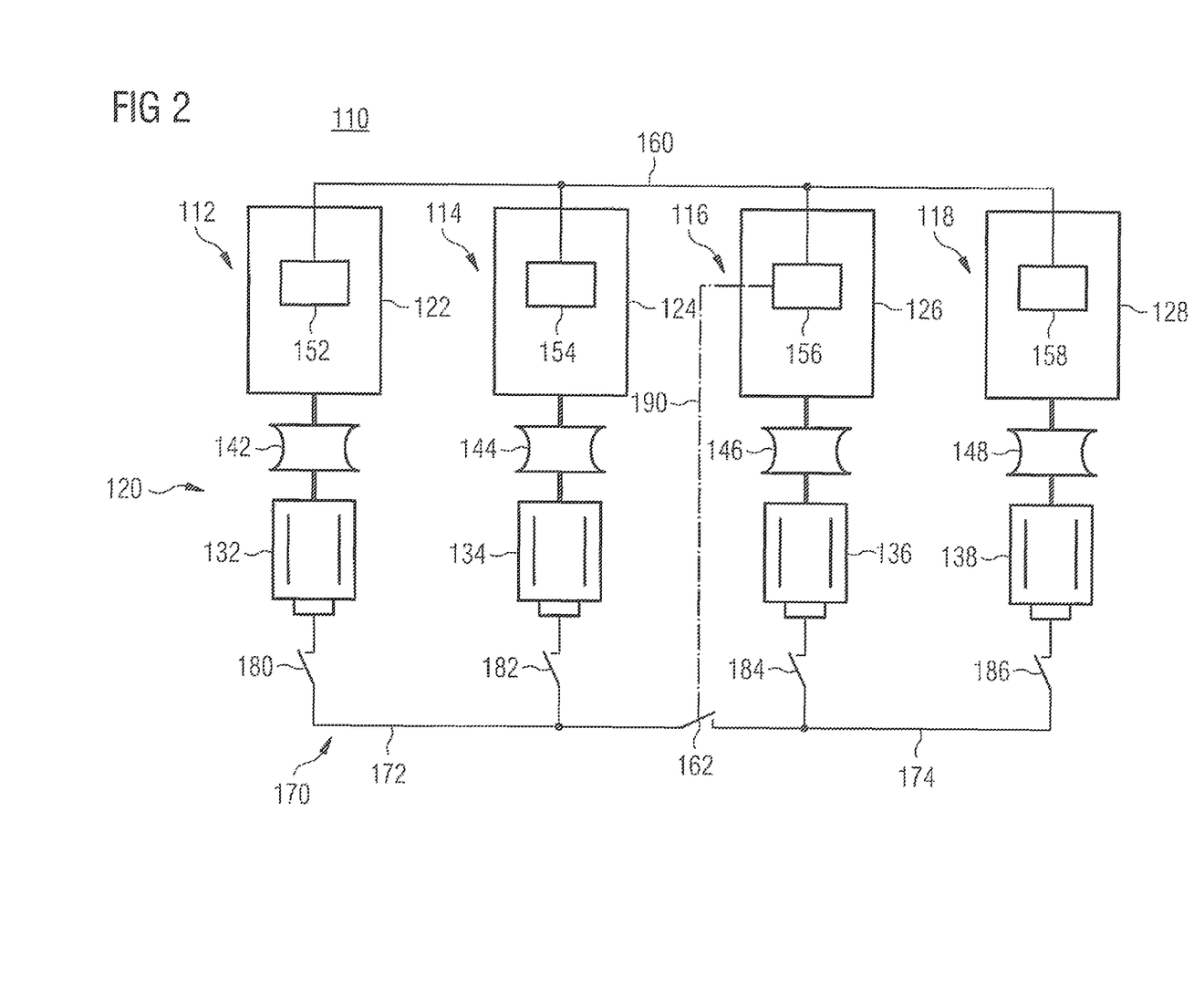
FIG. 2 shows a group of generator sets including another embodiment of the control system according to the present disclosure.

Referring to FIG. 2, another embodiment of a generator set group 110 is shown. Again, group 110 is build up by four generator sets 112, 114, 116, and 118. As one skilled in the art will appreciate, similar components with similar functionalities as those already described in conjunction with the embodiment shown in FIG. 1 are indicated with respective reference numerals in the 1xx series. In the following, the description focuses on differences to the embodiment shown in FIG. 1.

The embodiment shown in FIG. 2 includes two load bus segments 172, 174 arranged in series, which are electrically connectable and isolatable to one another by load bus tie breaker 162. Specifically, in case load bus tie breaker 162 is in a closed position or state, first and second load bus segments 172 and 174 are electrically coupled. Alternatively, in case load bus tie breaker 162 is in an opened position or state (as schematically indicated in FIG. 2), first and second load bus segments 172 and 174 are electrically isolated from one another. To transmit position data, load bus tie breaker 162 is connected to third engine control unit 165 via connection line 190.

As can be further seen in FIG. 2, two generator sets respectively share the same load bus segment. Particularly, first and second generator set 112 and 114 are connectable to first load bus segment 172 via respective tie breakers 180, 182, and third and fourth generator sets 116, 118 are connectable to second load bus segment 174 via respective tie breakers 184, 186.

It is noted that, again, all control units 152, 154, 156 and 158 are connected to common data bus 160.

Figure 3:
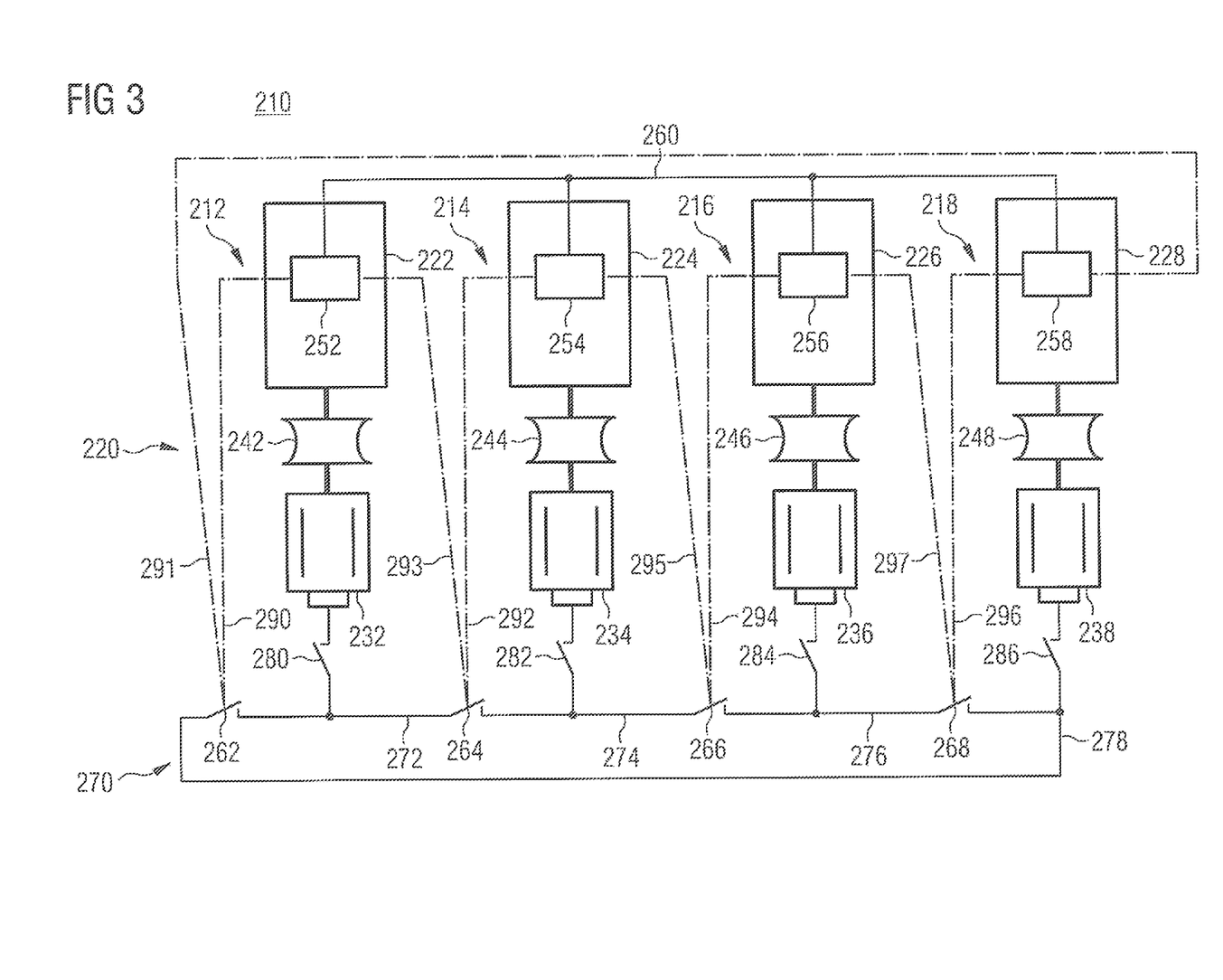
FIG. 3 shows a group of generator sets including yet another embodiment of the control system according to the present disclosure.

Turning to FIG. 3, a further embodiment of a group of generator sets is referred to in its entirety by reference numeral 210. Again, the following description focuses on differences to previously described embodiments. Similar components including similar functionalities as those already described are indicated with respective reference numerals in the 2xx series.

The embodiment shown in FIG. 3 is particularly similar to the embodiment shown in FIG. 1. However, each load bus tie breaker is connected to two control units of different generator sets.

For example, first load bus tie breaker 262 is communicatively connected to first control unit 252 of first generator set 212 via first communication line 290, and to fourth control unit 258 of fourth generator set 218 via another communication line 291 for transmitting its position data thereto.

In the configuration shown in FIG. 3, each tie breaker is directly connected to both control units, which are associated with the load bus segments (via the respective generator set connectable to the respective load bus segment) at which the respective tie breaker is disposed. In other words, each tie breaker is directly connected to the control units associated with the respective upstream and downstream load bus segments.

In other embodiments, more communication lines may be provided between load bus tie breakers and control units of further generator sets, which may increase redundancy, and, therefore, system reliability.

Figure 4:
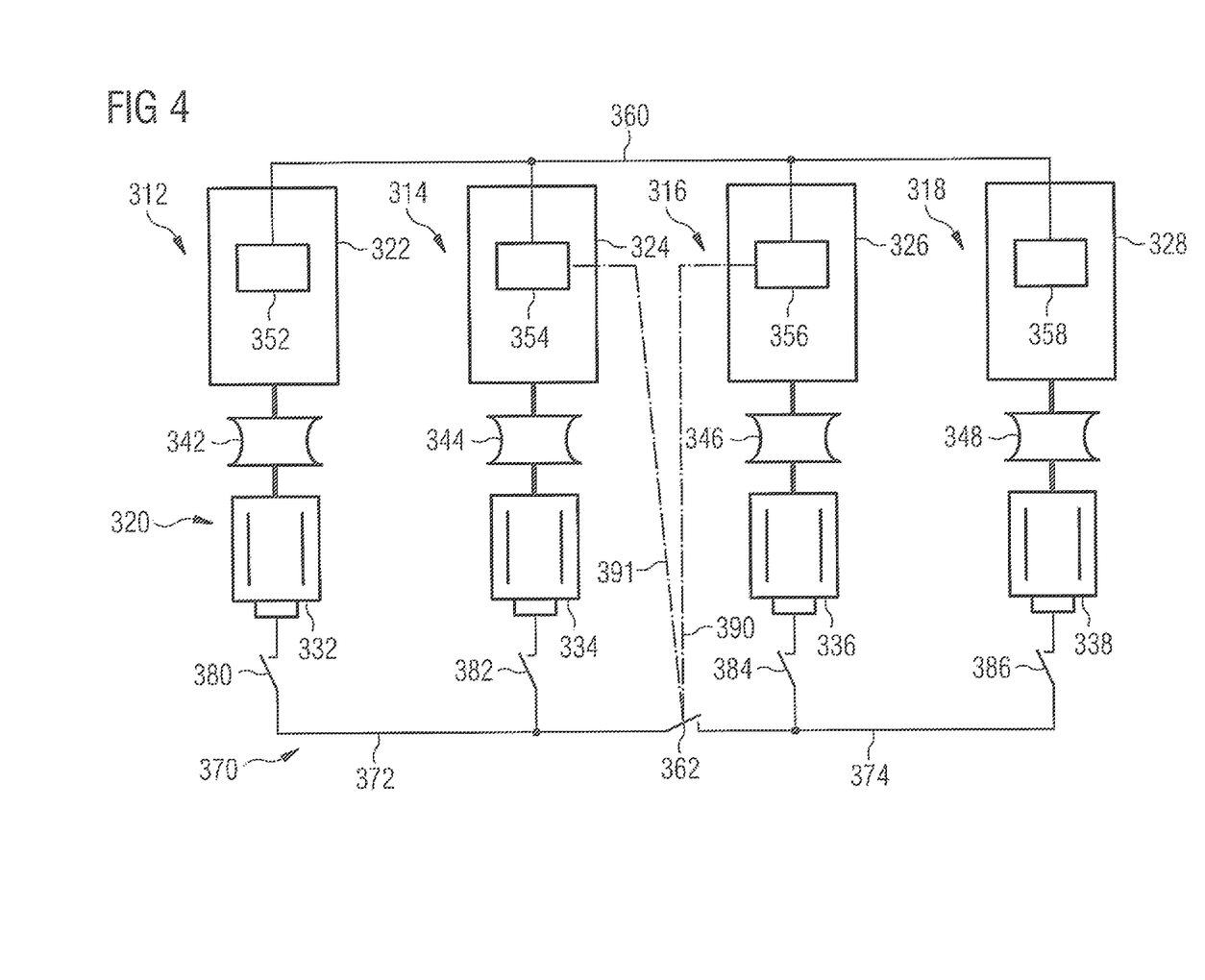
FIG. 4 shows a group of generator sets including yet another embodiment of the control system according to the present disclosure.

A further embodiment is shown in FIG. 4, which is particularly alluded on the embodiment shown in FIG. 2. Again, similar components including similar functionalities as those already described are indicated with respective reference numerals in the 3xx series.

Here, load bus tie breaker 362, which selectively couples or decouples first load bus segment 372 and second load bus segment 374, is connected to second control unit 354 and third control unit 356 via communication lines 390 and 391.

INDUSTRIAL APPLICABILITY

In the following, functionality of the control system generally disclosed herein is described with reference to the embodiments shown in FIGS. 1 to 4. The functionality is described by way of an exemplary method. One skilled in the art will appreciate that methods according to the present disclosure may not include all method steps described hereinafter. Alternatively or additionally, a method may include alternative, additional and/or adapted method steps.

Initially, reference is made to the embodiment shown in FIG. 1. For controlling group 10 of generator sets 12, 14, 16, and 18, each control unit 52, 54, 56, and 58 simultaneously or successively receives a position signal from the respective directly connected tie breaker 62, 64, 66, and 68. Said signals are transmitted via communication lines 90, 92, 94, and 96, and include information indicating a closed position or opened position of the respective tie breaker 62, 64, 66, and 68. For example, first control unit 52 receives a signal from first load bus tie breaker 62 indicating its position, and, thus, if first and fourth load bus segments 72 and 78 are connected or disconnected.

Upon receipt, control units 52, 54, 56, and 58 forward the respective signal, for example in a pre-processed or processed form, to remaining control units 52, 54, 56, and 58 via common data bus 60. The signals are received by remaining generator sets 12, 14, 16, 18. For instance, first control unit 52 applies the position signal of first tie breaker 62 to data bus 60, and, second, third and fourth control unit 54, 56, and 58 receive said signal of first tie breaker 62 via data bus 60.

As a result, each control unit 52, 54, 56, 58 receives information on the position of each tie breaker 62, 64, 66, and 68. Based on that information, control units 52, 54, 56, 58 are capable to allocate a load group number for their respective generator set 12, 14, 16, 18, and, thus to adapt operation of generator sets 12, 14, 16, 18. Generally, allocating load group numbers is required to control generator sets 12, 14, 16, and 18 particularly in load share applications, in which two or more load bus segments are connected via a closed tie breaker. In practical terms, generator sets with identical load group numbers have load bus segments that are connected via closed load bus tie breakers.

Exemplary assuming that second load bus tie breaker 64 is in a closed position, thereby, coupling first load bus segment 72 and second load bus segment 74. Further assuming that remaining load bus tie breakers 62, 66, and 68 are in an opened position to isolate fourth and first load bus segments 78 and 72, second and third load bus segments 74 and 76, and third and fourth load bus segments 76 and 78, respectively. Initially, position information on the position of each load bus tie breaker 62, 64, 66, and 68 is received by respective directly connected control unit 52, 54, 56, and 58, and subsequently passed on to each other control unit 52, 54, 56, and 58 via data bus 60. Based on the information that first tie breaker 62 is in an opened state, first control unit 52 allocates load group one to first generator set 12, and applies this information on data bus 60. As second tie breaker 64 is in a closed state, second control unit 54 also allocates load group one to second generator set 14, and provides that information to data bus 60. First and second control units 52 and 54 may double-check the allocated load group number of the other as both received information on both tie breakers 62 and 64 via direct connection or data bus 60. As third load bus tie breaker 66 is opened and generator sets 12 and 14 have been allocated with load group one, third control unit 56 allocates load group two to third generator set 16. Analogous, fourth control unit 58 allocates load group three to fourth generator set 18. As first and second generator sets 12 and 14 have been allocated with the same load group number, both are operated by their respective control unit 52, 54 in coordination with the other one. For example, control units 52 and 54 may control generator sets 12 and 14 to equally share a common load on connected load bus segments 72 and 74. Remaining control units 56 and 58 independently control their generator sets 16 and 18 as those are not connected to one another or to load group one build up by first and second generator sets 12 and 14.

In some embodiments, each generator set and/or internal combustion engine may be provided with an individual identification number stored in the respective control unit, for example as described herein as first, second, third, and fourth generator set and/or internal combustion engine. In operation, the control units may allocate a load group number corresponding to the individual identification number of the generator set and/or internal combustion engine in case the connected tie breaker (tie breaker arranged upstream of the load bus segment associated with the generator set) is in an opened state. Referring back to the example described above, in which second load bus tie breaker 64 is in a closed position, and remaining load bus tie breakers 62, 66, and 68 are in an opened position. First and second control units 52, 54 allocate load group one to their generator sets 12, 14 as explained above. Further, third control unit 56 allocates load group number three to its generator set 16, and fourth control unit 58 allocates load group four to its generator set 18. Although load group number two has not been assigned, the allocated load groups one, three and four are unambiguously allocated.

Load group allocation of generator sets 12, 14, 16, and 18 may be iteratively performed as described above such that control units allocate load groups one after another. Alternatively, load group allocation may be simultaneously performed by each control unit.

As load group allocation may take some time, for example in the milliseconds range, generator sets 12, 14, 16, and 18 may be operated in a transition mode during load group allocation, for example to prevent occurrence of undefined conditions and reduce mutual interference between generator sets connected to one another via closed tie breakers. For example, the transition operation mode may include allowing a preset engine speed reduction in a droop operation mode, or may include an isochronous operation mode as explained herein later on.

Referring to the embodiment shown in FIG. 2, a method for controlling group 110 incorporates that first and second generator sets 112 and 114 always share the same load group number if operated and connected to first load bus segment 172 via closed generator set tie breakers 180 and 182. Similarly, third and fourth generator sets 116 and 118 share the same load group number. As a result, two situations are conceivable for the embodiment shown in FIG. 2 in case each generator set 112, 114, 116, and 118 is operated.

In one case, load bus tie breaker 162 is in an opened state, and thereby isolates first load bus segment 172 and second load bus segment 174. Consequently, first and second control units 152 and 154 allocate load group one to their generator sets 112 and 114, and operate the same accordingly. Similarly, third and fourth control units 156 and 158 allocate load group two to generator sets 116 and 118.

In another case, load bus tie breaker 162 is in a closed state to electrically couple first and second load bus segments 172 and 174, and, thus, first to fourth generator sets 112, 114, 116, and 118. The position signal of load bus tie breaker 162 is received by third control unit 156 via direct connection 190, and is provided to remaining control units 152, 154, and 158 via data bus 160. Based on that information, each control unit 152, 154, 156, 158 allocates load group one to its generator set 112, 114, 116, and 118, and controls the same accordingly, for example, by equally sharing the common load.

Referring to the embodiment shown in FIG. 3, a method for controlling group 210 may further incorporate that each control unit 252, 254, 256, and 258 directly receives position signals from two load bus tie breakers. As a result, position information of a respective tie breaker at a first hand level is redundantly available due to two direct connections outgoing from each load bus tie breaker 262, 264, 266, and 268. That redundancy may be used to increase reliability of the control system. For example, assuming that second control unit 254 receives a signal from third load bus tie breaker 266 via communication line 295 indicating an opened state. Assuming further that at the same time third control unit 256 receives a signal from the same load bus tie breaker 266 via communication line 294 indicating a closed state. As both control units 254 and 256 share their received information on data bus 260, the discrepancy can be detected. Specifically, it is determined that the signals relating to load bus tie breaker 266 are unequal. Various reasons for such a situation may be conceivable including, but not limited to, malfunctions of third tie breaker 266, communication lines 294 and 295, control units 254 and 256, and/or data bus 260. In any case, to avert or at least reduce any damage to the control system and generator sets, control units 254 and 256 may control their generator sets 214 and 216 from a normal operation mode into an emergency operation mode. Said emergency operation mode may further facilitate identifying the occurred malfunction(s). In case generator set 214 and/or generator set 216 may be connected to generator set 212 and/or 218 via closed load bus tie breakers 262, 264 and/or 268, said coupled generator sets 212 and/or 218 may be also governed to an emergency operation mode.

Lastly referring to the embodiment shown in FIG. 4, a method for controlling group 310 may incorporate method steps analogous to the ones described above in conjunction with FIGS. 2 and 3.

It is contemplated that some embodiments of the present disclosure may include combinations of features disclosed in connection with any embodiment described in detail herein, where applicable.

In some embodiments, an emergency operation mode and/or a transition operation mode may include a so-called droop operation mode. In droop operation mode, a preset reduction in engine speed is allowed. Said allowed engine speed reduction may depend on the engine load such that higher engine speed reductions may be allowed at higher engine loads. By allowing a preset engine speed reduction in droop operation mode, for instance, mutual interference between generator sets connected to one another via a common grid, for example by a closed load bus tie breaker, may be suppressed or reduced.

For example, in case a droop of 5% (or a droop of 50 rpm) may be allowed, an engine, which would run at 1000 rpm in rated operation at a given load, is allowed to run within a range between 950 rpm and 1000 rpm. In practical terms, in droop operation mode, an internal combustion engine is operated with a soft feedback control relative to a hard feedback control allowing merely minor or substantially no engine speed changes during, for example, normal operation.

In some embodiments, emergency operation mode or transition operation mode may include an isochronous load sharing mode. For example, in said isochronous load sharing mode, one generator set control unit may be configured as a master control unit, and the remaining control units may be configured as slave control units receiving instructions from the master control unit.

Additionally or alternatively, emergency operation mode may include shutting down an affected generator set for safety reasons.

As used herein, the term load group number may not necessarily refer to a number, but to any conceivable unambiguous assignment such as numbers, characters, symbols, etc.

As outlined herein, the control systems and methods according to the present disclosure feature a simple, reliable and less complicate configuration compared to a control system that does not utilize a common data bus. The configuration allows setting up a highly responsive control of a plurality of generator sets. Moreover, due to a certain desired degree of redundancy in some embodiments, the control systems may allow to detect malfunctions in a quick and reliable manner to apply countermeasures already at an early stage where applicable, or to quickly shut down the generator sets to avert or reduce any further damage.

Although the preferred embodiments of this invention have been described herein, improvements and modifications may be incorporated without departing from the scope of the following claims.

The invention claimed is:

1. A control system for operating a plurality of generator sets, the control system comprising:
a plurality of control units configured to control an operation of a respective one of the plurality of generator sets;
a data bus connected to the plurality of control units for transmitting data;
a plurality of load bus segments configured to be connected to the respective one of the plurality of generator sets; and
at least one tie breaker being arranged between two load bus segments of the plurality of load bus segments to selectively connect the two load bus segments in a closed position and isolate the two load bus segments in an opened position, and the tie breaker being directly connected to at least one of the plurality of control units, wherein the at least one of the plurality of control units is further configured to:
receive a first signal from the tie breaker indicative of a position of the tie breaker; and
provide the first signal to at least one further control unit of the plurality of control units via the data bus, wherein the control units are configured to allocate a load group number for the respective generator set based on the first signal.

2. The control system of claim 1, wherein the control units are further configured to receive at least one signal from the at least one further control unit via the data bus, the signal being indicative of a position of a respective tie breaker directly connected to the at least one further control unit.

3. The control system of claim 1, wherein the control units are configured to operate the respective generator set in a transition operation mode during allocation of the load group number.

4. The control system of claim 1, wherein the load bus segments are arranged in series in a closed loop.

5. The control system of claim 1, wherein the at least one tie breaker comprises two or more tie breakers.

6. The control system of claim 1, wherein the data bus is configured as a CAN Bus.

7. The control system of claim 1, wherein
each generator set comprises an internal combustion engine and a generator, the internal combustion engine being operatively coupled to the respective generator; and
the control units are configured as engine control units.

8. The control system of claim 1, wherein
the generator sets include a first generator set, a second generator set, a third generator set, and a fourth generator set,
the first generator set and the second generator set are connected to a first load bus segment,
the third generator set and the fourth generator set are connected to a second load bus segment, and
the at least one tie breaker is arranged between the first load bus segment
and the second load bus segment.

9. A method for operating a plurality of generator sets selectively connectable to one another via at least one tie breaker to form load groups, the method comprising:
receiving, by a first generator set of the plurality of generator sets, a first signal from a first tie breaker of the at least one tie breaker, the first signal being indicative of a closed position or an opened position of the first tie breaker;
providing, by the first generator set, the first signal to at least one further generator set of the plurality of generator sets;
receiving, by the at least one further generator set, the first signal from the first generator set;
operating the plurality of generator sets based on the first signal
receiving, by a second generator set of the plurality of generator sets, a second signal from the first tie breaker, the second signal being indicative of a closed position or an opened position of the first tie breaker;
providing, by the second generator set, the second signal to at least one further generator set of the plurality of generator sets; and
receiving, by the at least one further generator set, the second signal from the second generator set,
wherein the method step of operating the plurality of generator sets is further based on the second signal.

10. The method of claim 9, wherein the method step of operating the plurality of generator sets comprises:
   determining that the first signal is unequal to the second signal; and
   operating at least one of the plurality of generator sets in an emergency operation mode.

11. The method of claim 10, wherein the emergency operation mode includes operating an engine associated with the respective generator set at a reduced engine speed.

12. The method of claim 9, further comprising:
   receiving, by a third generator set of the plurality of generator sets, a third signal from a second tie breaker of the at least one tie breaker, the third signal being indicative of a closed position or opened position of the second tie breaker;
   providing, by the third generator set, the third signal to at least one further generator set of the plurality of generator sets; and
   receiving, by the at least one further generator set, the third signal from the third generator set,
   wherein the method step of operating the plurality of generator sets is further based on the third signal.

13. The method of claim 9, wherein the method step of operating the plurality of generator sets further comprises:
   allocating, by each generator set, a load group number for each generator set based on the at least one received signal; and
   operating the generator sets with the same load group number to share a common load, particularly to equally share the common load.

14. The method of claim 13, wherein the generator sets with the same load group number share the common load equally.

15. A control system for operating a plurality of generator sets, the control system comprising:
   a plurality of control units configured to control an operation of a respective one of the plurality of generator sets;
   a data bus connected to the plurality of control units for transmitting data;
   a plurality of load bus segments configured to be connected to the respective one of the plurality of generator sets; and
   at least one tie breaker being arranged between two load bus segments of the plurality of load bus segments to selectively connect the two load bus segments in a closed position and isolate the two load bus segments in an opened position, and the tie breaker being directly connected to at least one of the plurality of control units, wherein
   the at least one of the plurality of control units is further configured to:
      receive a first signal from the tie breaker indicative of a position of the tie breaker;
      provide the first signal to at least one further control unit of the plurality of control units via the data bus, wherein each tie breaker is directly connected to at least two of the control units;
      determine that the first signal is unequal to a second signal from the at least one tie breaker received via the data bus; and
      operate the respective generator set in an emergency operation mode.

16. The control system of claim 15, wherein the emergency operation mode includes operating an engine associated with the respective generator set at a reduced engine speed.

17. The control system of claim 15, wherein the emergency operation mode includes configuring a first control unit from the control units as a master control unit and remaining control units of the control units as slave control units, wherein the slave control units may be configured to receive instructions from the master control unit.

* * * * *